United States Patent
Quinn et al.

(10) Patent No.: US 9,489,827 B2
(45) Date of Patent: Nov. 8, 2016

(54) SYSTEM AND METHOD FOR DISTRIBUTING CONTENT IN A VIDEO SURVEILLANCE NETWORK

(75) Inventors: Paul Quinn, San Francisco, CA (US); Jiang Zhu, Sunnyvale, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 934 days.

(21) Appl. No.: 13/417,827

(22) Filed: Mar. 12, 2012

(65) Prior Publication Data

US 2013/0235192 A1    Sep. 12, 2013

(51) Int. Cl.
| | | |
|---|---|---|
| H04N 7/18 | (2006.01) | |
| G08B 29/16 | (2006.01) | |
| G08B 13/196 | (2006.01) | |
| H04N 21/858 | (2011.01) | |

(52) U.S. Cl.
CPC .......... *G08B 29/16* (2013.01); *G08B 13/19645* (2013.01); *G08B 13/19656* (2013.01); *G08B 13/19669* (2013.01); *H04N 7/18* (2013.01); *H04N 21/8586* (2013.01)

(58) Field of Classification Search
CPC ............. H04L 67/104; H04L 67/1065; H04L 67/1046; H04L 67/1048; H04L 67/108; H04L 45/745; H04L 67/1076; H04L 69/329
USPC ....................................................... 348/143
See application file for complete search history.

(56) References Cited

U.S. PATENT DOCUMENTS

| | | |
|---|---|---|
| 4,254,500 A | 3/1981 | Brookhart |
| 5,262,964 A | 11/1993 | Bonsall et al. |
| 5,822,537 A | 10/1998 | Katseff et al. |
| 5,926,208 A | 7/1999 | Noonen et al. |
| 6,430,652 B1 | 8/2002 | Fechser et al. |
| 6,667,992 B1 | 12/2003 | Yanagawa |
| 6,876,705 B2 | 4/2005 | Katsavounidis et al. |
| 6,965,601 B1 | 11/2005 | Nakano et al. |
| 7,304,994 B2 | 12/2007 | Dubmicki et al. |
| 7,478,120 B1 | 1/2009 | Zhang |
| 8,019,194 B2 | 9/2011 | Morrison et al. |
| 8,392,552 B2 | 3/2013 | Alexander et al. |
| 8,463,825 B1 | 6/2013 | Harty et al. |
| 8,468,304 B1 | 6/2013 | Corbett |
| 8,510,370 B2 | 8/2013 | Quinn et al. |
| 8,700,769 B2 | 4/2014 | Alexander et al. |

(Continued)

OTHER PUBLICATIONS

U.S. Appl. No. 13/473,133, filed May 16, 2012 entitled "System and Method for Video Recording and Retention in a Network," Inventor: Elango Ganesan, et al.

(Continued)

*Primary Examiner* — Frederick Bailey
*Assistant Examiner* — Farhan Mahmud
(74) *Attorney, Agent, or Firm* — Patent Capital Group

(57) ABSTRACT

A method is provided in one example embodiment and includes creating a key from a hash of a resource identifier associated with a video object; storing the video object in a distributed hash table with the key; and replicating the video object in the distributed hash table based on a redundancy factor associated with the video object. In more particular embodiments, the method can include fragmenting the video object into segments; creating sub-keys with a hash of resource identifiers associated with each of the segments; storing the segments in the distributed hash table with the sub-keys; and replicating the segments in the distributed hash table based on the redundancy factor.

22 Claims, 5 Drawing Sheets

(56) References Cited

U.S. PATENT DOCUMENTS

| | | | |
|---|---|---|---|
| 9,049,349 | B2 | 6/2015 | Ganesan et al. |
| 9,060,001 | B2 | 6/2015 | Luong et al. |
| 2004/0019681 | A1 | 1/2004 | Nakamura et al. |
| 2005/0091311 | A1 | 4/2005 | Lund et al. |
| 2005/0135381 | A1 | 6/2005 | Dubnicki et al. |
| 2006/0023786 | A1 | 2/2006 | Li et al. |
| 2006/0274829 | A1 | 12/2006 | Siemens et al. |
| 2007/0035623 | A1 | 2/2007 | Garouette et al. |
| 2007/0174309 | A1 | 7/2007 | Pettovello |
| 2007/0217501 | A1 | 9/2007 | Siemens et al. |
| 2007/0248226 | A1* | 10/2007 | Chong ............... H04N 21/2383 380/200 |
| 2007/0273696 | A1* | 11/2007 | Cheng et al. ................. 345/467 |
| 2008/0298470 | A1 | 12/2008 | Boyce et al. |
| 2009/0193314 | A1 | 7/2009 | Melliar-Smith et al. |
| 2009/0228511 | A1 | 9/2009 | Atkin et al. |
| 2010/0146003 | A1 | 6/2010 | Bruso et al. |
| 2010/0189367 | A1 | 7/2010 | Van der Merwe et al. |
| 2011/0249086 | A1 | 10/2011 | Guo et al. |
| 2012/0218416 | A1 | 8/2012 | Leny et al. |
| 2012/0294373 | A1 | 11/2012 | Mochizuki et al. |

OTHER PUBLICATIONS

USPTO Oct. 13, 2013 Non-Final Office Action from U.S. Appl. No. 13/281,125.

Honovich, John, "Video Surveillance as a Service (VSaaS) Comparison 2010," IP Video Market Info-The Source for Video Surveillance, Jul. 21, 2011, 7 pages http://ipvm.com/report/hosted_managed_video_surveillance_comparison_.

Joung, et al., "KISS: A Simple Prefix Search Scheme in PSP Networks," 9th International Workshop on the Web and Databases (WebDB 2006), Jun. 30, 2006, pp. 56-61 http://db.ucsd.edu/webdb2006/camera-ready/paginated/11-149.pdf.

Ramabhadran, et al. "Prefix Hash Tree: an Indexing Data Structure over Distributed Hash Tables," XP-002467877, Feb. 2004; 10 pages http://berkeley.intel-research.net/sylvia/pht.pdf.

Tisch, Steven, "Intelligence at the Edge," youtube, posted Apr. 23, 2010 http://www.youtube.com/watch?v=DoSPI3N5eTs.

Weatherspoon, Hakim, et al., "Erasure Coding vs. Replication: A Quantitative Comparison," In Proceedings of the First International Workshop on Peer-to-Peer Systems (IPTPS 2002), Mar. 7-8, 2002, 6 pages http://citeseerx.ist.psu.edu/viewdoc/download?doi=10.1.1.16.5545&rep=rep1&type=pdf.

U.S. Appl. No. 13/023,455, filed Feb. 8, 2011 entitled "Reliable Data Dissemination Over Dynamic Peer-to-Peer Systems," Inventors: Danjue Li, et al.

U.S. Appl. No. 13/281,125, filed Oct. 25, 2011 entitled "Prefix and Predictive Search in a Distributed Hash Table," Inventors: Steven V. Luong, et al.

Emil Sit, et al., "A DHT-based Backup System," 2003, 5 pages; http://doc.cat-v.org/plan_9/misc/venti-dhash/sit.pdf.

Marcel Karnstedt, et al., "UniStore: Querying a DHT-based Universal Storage," Technical report LSIR-Report-2006-011, 4 pages; http://www.manfredhauswirth.org/research/papers/LSIR-REPORT-2006-011.pdf.

USPTO Apr. 9, 2014 Final Office Action from U.S. Appl. No. 13/281,125.

USPTO Aug. 13, 2014 Non-Final Office Action from U.S. Appl. No. 13/473,133.

USPTO Feb. 4, 2015 Notice of Allowance from U.S. Appl. No. 13/473,133.

* cited by examiner

SYSTEM AND METHOD FOR DISTRIBUTING CONTENT IN A VIDEO SURVEILLANCE NETWORK

TECHNICAL FIELD

This disclosure relates in general to the field of video surveillance, and more particularly, to a system and a method for distributing content in a video surveillance network.

BACKGROUND

Physical security is a top priority for many organizations and governments. To help create a safe and secure environment, security personnel develop plans, train staff, and implement systems such as surveillance cameras, access controls, and radio systems. These investments help to protect against threats from manmade and natural disasters. They can also be far more effective to manage when tied together over an existing network. Benefits of network configurations include earlier threat detection, faster response times, and enhanced collaboration with local law enforcement organizations. However, as new threats continue to emerge, managing security assets and information continues to present significant challenges to security vendors and operators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes creating a key from a hash of a resource identifier associated with a video object. The video object reflects any suitable element that may be captured by a particular network element (e.g., a camera). The video object could be representative of packet information, streaming video, media of any type, audiovisual information in any form, videoconferencing data, digital information in any format, or any other suitable information that may be propagating in the network. The method can also include storing the video object in a distributed hash table with the key, and replicating the video object in the distributed hash table based on a redundancy factor associated with the video object. In more particular embodiments, the method can include fragmenting the video object into segments; creating sub-keys with a hash of resource identifiers associated with each of the segments; storing the segments in the distributed hash table with the sub-keys; and replicating the segments in the distributed hash table based on the redundancy factor.

In yet other examples, the method can include fragmenting the video object into segments, where sizing of the segments is determined based on an overhead factor. The overhead factor can be based, at least, on a storage capacity associated with a particular network element that received the video object, and a size associated with the video object. In certain implementations, the resource identifier is an extensible resource identifier.

The method can also include storing the key and the resource identifier in a descriptor that is provided in the distributed hash table. The method can also include fragmenting the video object into segments; encoding an offset of each of the segments into a plurality of extensible resource identifiers; creating sub-keys with a hash of the plurality of extensible resource identifiers associated with each of the segments; storing the segments in the distributed hash table with the sub-keys; and replicating the segments in the distributed hash table based on the redundancy factor.

Certain other activities can include a method that fragments the video object into segments, where sizing of the segments is determined based on an overhead factor. Subsequently, sub-keys are created from a hash of resource identifiers associated with each of the segments. The segments are stored in the distributed hash table with the sub-keys, and the segments are replicated in the distributed hash table based on the redundancy factor. In certain examples, the method can also include providing a storage policy for a plurality of video objects propagating in a network, where the storage policy defines storage activities for particular content, and where the storage policy can be adjusted based on properties associated with the plurality of video objects.

Example Embodiments

Figure 1:
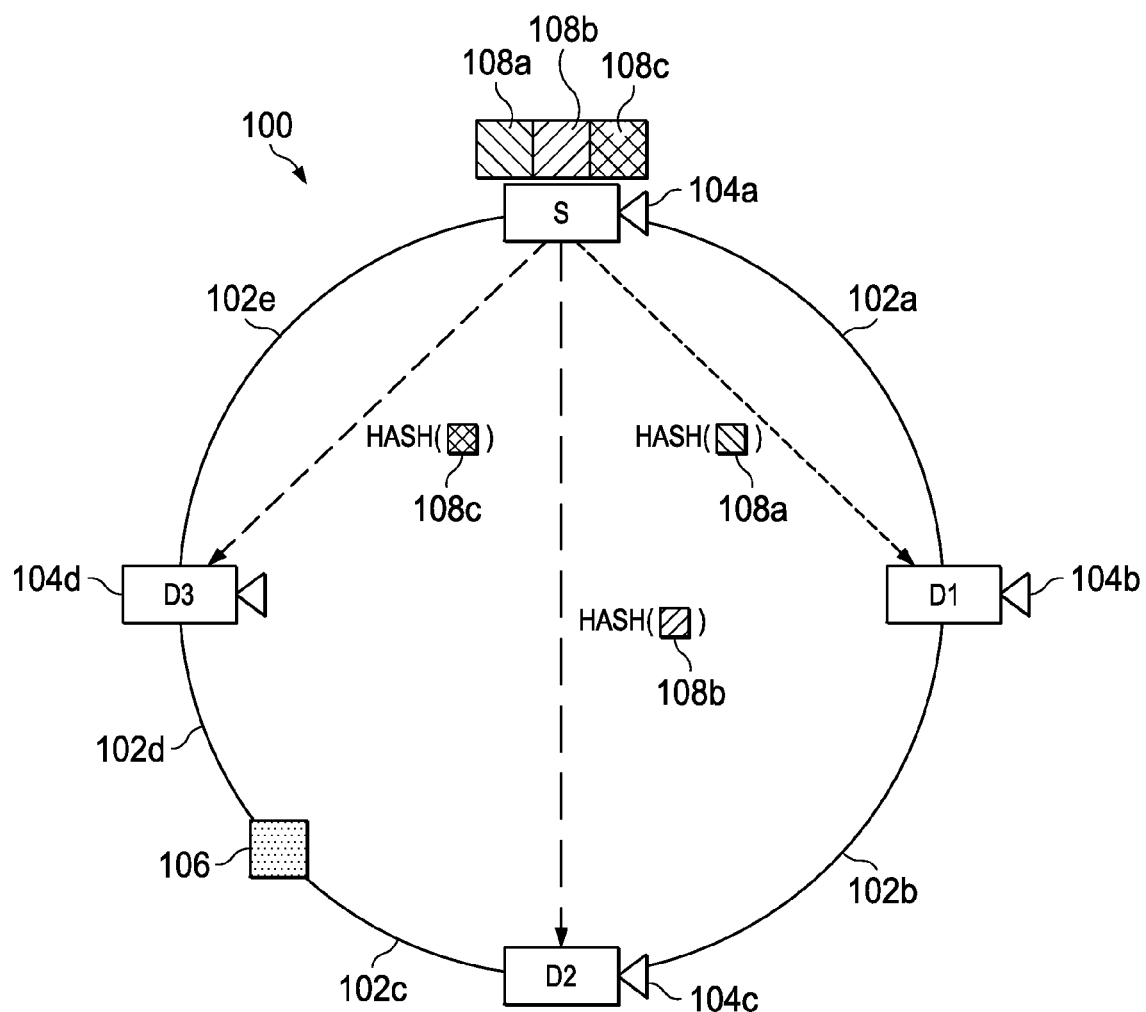
FIG. 1 is a simplified logical diagram illustrating an example configuration of a video surveillance system in accordance with one embodiment of this disclosure.

Turning to FIG. 1, FIG. 1 is a simplified logical diagram of an example configuration of a video surveillance system 100 in accordance with an embodiment of the present disclosure. Surveillance system 100 generally includes a ring of nodes connected through a plurality of logical links 102a-102e. More particularly, in this example embodiment, the nodes of surveillance system 100 include image sensors (e.g., a plurality of cameras 104a-104d) and a storage node 106. Each of cameras 104a-104d may include local storage, which may be used in addition to (or as an alternative for) storage node 106. A given source camera such as camera 104a may acquire video and, subsequently, store the video as a plurality of video objects 108a-108c, for example. Video objects 108a-108c may be replicated and distributed to other nodes, as described in more detail below.

FIG. 1 is a logical representation of surveillance system 100 that is independent of the underlying network infrastructure. Each of the elements of FIG. 1 may couple to one another through simple interfaces or through any other suitable connection (wired or wireless), which provides a viable pathway for network communications. Additionally, any one or more of these elements of FIG. 1 may be combined or removed from the architecture based on particular configuration needs. Surveillance system 100 may include a configuration capable of transmission control protocol/Internet protocol (TCP/IP) communications for the transmission or reception of packets in a network flow. Surveillance system 100 may also operate in conjunction with a user datagram protocol/IP (UDP/IP), Fibre Channel over Ethernet (FCoE), or any other suitable protocol where appropriate and based on particular needs.

For purposes of illustrating certain example embodiments of surveillance system 100, it is important to understand certain activities and communications occurring within such a system. Contextual information is provided below to offer an overview of some challenges of managing resources in a video surveillance network. Such information is offered earnestly and for teaching purposes only and, therefore, should not be construed in any way to limit the broad applications of the present disclosure.

In many cases, storage (in various forms) is added to IP security cameras. In some deployments, this local camera storage is used in lieu of local server storage (e.g., for cost reasons). Given the nature of security video, the video should be available even if a camera is attacked, or if it fails. Therefore, content redundancy and resiliency are important in such deployments. In general, a distributed hash table (DHT) is a decentralized distributed system that provides a lookup service similar to a hash table. Key/value pairs can be stored in a DHT, and any participating node can efficiently retrieve the value associated with a given key. A key includes any index, tag, or other identifier that can be used to distinguish values in a DHT. Responsibility for maintaining the mapping from keys to values is distributed among the nodes in such a way that a change in the set of participants causes a minimal amount of disruption. This allows a DHT to scale to extremely large numbers of nodes and, further, to handle continual node arrivals, departures, and failures.

A DHT can be generally decomposed into several main components including an abstract keyspace, a keyspace partitioning scheme, and an overlay network. A keyspace partitioning scheme splits ownership of the keyspace among the participating nodes. An overlay network connects the nodes and provides location-independent routing in the keyspace: allowing the nodes to find the owner of any given key in the keyspace.

In one example implementation, a structured overlay network is built in a 256-bit keyspace and uses consistent hashing to map keys to nodes. This technique employs a function that defines an abstract notion of the distance between the keys $k_1$ and $k_2$, which is generally unrelated to geographical distance or network latency. Each node can be assigned a key called its identifier (ID). A node with ID $i_x$ owns all keys $k_m$ for which $i_x$ is the closest ID. For example, keys can be treated as points on a circle, and the abstract distance between $k_1$ to $k_2$ is the distance traveling clockwise around the circle from $k_1$ to $k_2$. Thus, the circular keyspace can be split into contiguous segments whose endpoints are the node identifiers. If $i_1$ and $i_2$ are two adjacent IDs, then the node with ID $i_2$ owns all the keys that fall between $i_1$ and $i_2$. Consistent hashing has the property that removal or addition of one node changes only the set of keys owned by the nodes with adjacent IDs, and leaves all other nodes unaffected.

Each node can maintain a set of links to other nodes, including its immediate neighbor and nodes in other parts of the ID space. In general, for any key k, each node either has a node ID that owns k or has a link to a node whose node ID is closer to k, in terms of the keyspace distance. A message may be routed to the owner of any key k using a greedy routing algorithm (that is not necessarily globally optimal). For example, at each step, the message can be forwarded to the neighbor whose ID is closest to k. When there is no such neighbor, then the node must be the owner of k.

Basic operations of a DHT including "putting" and "getting." For example, suppose the keyspace is a set of 160-bit strings. To store a file with given filename and data in the DHT, a hash (e.g., an SHA-1 hash) of filename can be generated, producing a 160-bit key k, and a message put(k, data) can be sent to any node participating in the DHT. The message may be forwarded from node to node through the overlay network until it reaches the single node responsible for key k, as specified by the keyspace partitioning. That node then stores the key and the data. Any other client can then retrieve the contents of the file by again hashing filename to produce k and asking any DHT node to find the data associated with k with a message get(k). The message will again be routed through the overlay to the node responsible for k, which will reply with the stored data.

Surveillance system 100 can be configured to provide redundancy and resiliency by distributing surveillance video content across the network with adaptive DHTs. The architecture is also configured to fragment content for efficient distribution. Surveillance system 100 can further control policies of replication, redundancy, and overhead for each video object, or for each group of video objects. Redundancy factors can be adaptively adjusted based on metrics derived from properties (e.g., priority) of each object or group of objects. Furthermore, the architecture of the present disclosure offers a distributed storage system for physical security camera deployments using adaptive DHTs. Moreover, the proposed system is practical for physical security camera deployments because video feeds from different physical cameras may have different levels of sensitivity and priority when being stored or retrieved.

In operation, the architecture can add several elements to a video system such as per-video object properties and effective policy management. For per-video object properties (e.g., in common DHTs), the DHT ring typically has one policy in terms of replication and redundancy. When objects with different priorities and sensitivity are stored by the system, this universal policy may not be adequate. By employing the teachings of the present disclosure, this problem can be addressed by employing a per-object or a per-object group policy in terms of replication and redundancy. Additionally, in existing DHT systems, the policies are commonly redefined. In contrast, different metrics for both overhead and replication, and per-video, can be used to determine the policy in the proposed system architecture. This effectively addresses the specific storage requirements for security camera systems.

Additionally, the architecture of surveillance system 100 is configured to create a virtual ring of authorized cameras and, further, uses hashing to distributed fragments of video in the topology with the original video residing on a root or source node. In example embodiments of surveillance system 100, data stored in a DHT may comprise descriptors, which contain metadata and pointers to video objects or segments. A descriptor and its corresponding content (i.e., video objects or fragments) may be stored on different nodes. For example, a descriptor for video object 108*a* (of FIG. 1) may be stored on camera 104*b*, and a copy of video object 108*a* (or a fragment thereof) may be stored on camera 104*c*.

Figure 2:
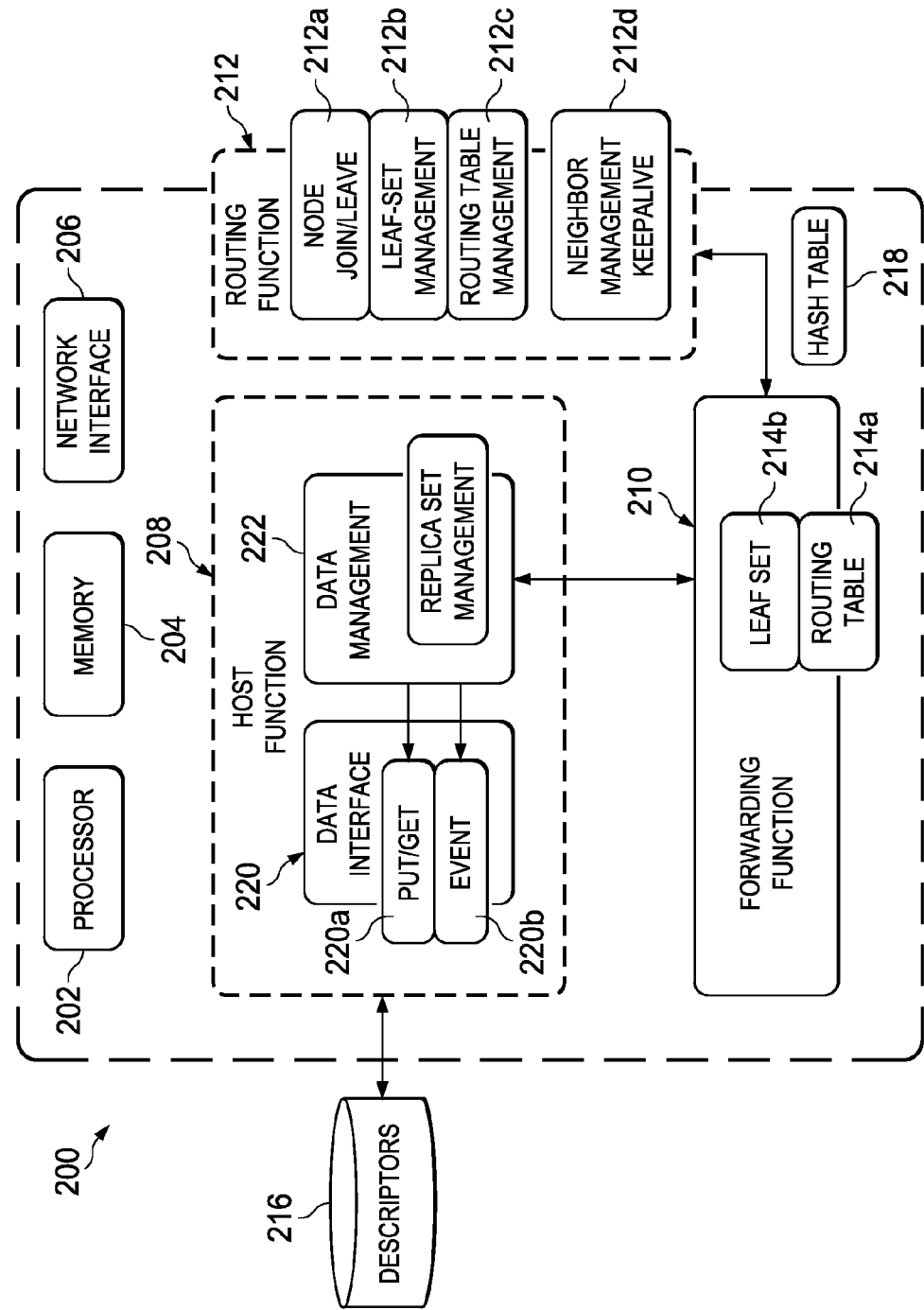
FIG. 2 is a simplified block diagram illustrating additional details that may be associated with a node in the surveillance system.

Turning to FIG. 2, FIG. 2 is a simplified block diagram illustrating additional details that may be associated with a DHT node 200 in surveillance system 100 (e.g., camera 104a or storage node 106). Node 200 includes a processor 202, a memory 204, and a network interface 206. Moreover, node 200 may include additional hardware and/or software elements to facilitate operations described herein, including a host function 208, a forwarding function 210, and a routing function 212. In a particular instance, at least some of the internal structure of node 200 can be reflective of a DHT.

Node 200 can also be configured to store, aggregate, process, export, and/or otherwise maintain media or other data in any appropriate format, where these activities can involve processor 202 and memory element 204. In addition, storage policies may be maintained and managed through one or more of the elements of node 200. For example, policies may be maintained within memory 204 and, further, dynamically adjusted based on various parameters, as discussed herein.

In one example implementation, node 200 may maintain a routing table 214a, a leaf set 214b, a plurality of DHT descriptors 216, and a hash table 218. Host function 208 may include a data interface 220 and a data management module 222. Data interface 220 may implement a plurality of put/get functions 220a and an event monitoring element 220b. A data management module 222 may provide replica set management functions, for example. Routing function 212 may include a join/leave management function 212a, a leaf-set management function 212b, a routing table management function 212c, and a neighbor management keepalive function 212d, for example. Join/leave management function 212 can provide keyspace assignments when nodes join and leave, and routing table management function 212c may update routing table 214a to maintain neighbor relationships.

In one example embodiment, a replica set may be defined as the m closest neighbors in the keyspace on the left of a node, where m is a redundancy factor, and a leaf set may be defined as the n closest neighbors to a node in the keyspace n/2 on each side of the node. In this example embodiment, each node owns a key range between itself (inclusive) and its right neighbor (clockwise neighbor, exclusive). All objects whose key falls within a node's key range are stored on that node and on its replica set. A joining node can take over a key range from its left neighbor, and a leaving node can give back a key range to its left neighbor. Removal or addition of a node changes the set of keys owned by adjacent nodes.

Nodes in a leaf set can periodically exchange reachability information to monitor replica set members. Information gathered from all members can be used to form a reachability matrix. A node remains in a leaf set when it can be reached by at least one other reachable member in the leaf set. If a node fails, all other nodes in the leaf set report that it cannot be reached, and it can be removed from the leaf set. The two neighbors of the failed node can assume the keyspace previously owned by the failed node. Other nodes that use the failed node as the next hop in their routing table can also detect the failure, and can subsequently replace the failed node with another node. If a new node joins the network, messages for the new node (or for keys in the keyspace of the new node) can be forwarded to one of the new node's neighbors. The neighbors can forward the message to the new node.

The nodes in surveillance system 100, including cameras 104a-104c and storage node 106, are representative of any suitable network element that can exchange packet information. This terminology is meant to encompass network appliances, servers, routers, switches, gateways, bridges, loadbalancers, modules, or any other device, component, element, or object operable to exchange information in a network environment. The nodes can also be representative of any suitable endpoints, which can have various potential applications. The network elements are configured to receive and/or capture data for subsequently propagating network communications. In one particular implementation, the network elements are representative of cameras (IP cameras, analog cameras, etc.) that can be for virtually any purpose (e.g., surveillance, advertisements, security, logging operations, maintenance activities, etc.). Furthermore, the broad term 'network element' is inclusive of devices used to initiate a communication such as any type of computer, a personal digital assistant (PDA), a laptop or electronic notebook, a wireless access point, a media server, a residential gateway, a modem, a cellular telephone, an iPhone, an IP phone, iPad, or any other device, component, element, or object capable of initiating or facilitating voice, audio, video, media, or data exchanges within a network environment. Moreover, the network elements may also be any device that seeks to initiate a communication on behalf of another entity or element, such as a program, a database, or any other component, device, element, or object capable of initiating an exchange within a network environment. Data, as used herein in this document, refers to any type of numeric, voice, video, media, or script data, or any type of source or object code, or any other suitable information in any appropriate format that may be communicated from one point to another.

In their configurations, the network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with the network elements of surveillance system 100, each of cameras 104a-104c, storage node 106, and other nodes can include memory elements for storing information to be used in the operations outlined herein. Each of cameras 104a-104c, storage node 106, and other nodes may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein should be construed as being encompassed within the broad term "memory element" or "memory." Information being used, tracked, sent, or received by cameras 104a-104c, storage node 106, and other nodes could be provided in any database, register, queue, table, cache, control list, or other storage structure, all of which can be referenced at any suitable timeframe. Any such storage options may be included within the broad term "memory element" or "memory" as used herein.

In certain example implementations, the distributed content functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one example implementation, cameras 104a-104c, storage node 106, and/or other nodes may include software modules (e.g., host function 208) to achieve, or to foster, the distributed content operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of cameras 104a-104c, storage node 106, and/or other nodes may include one or more processors (or virtual processors) that can execute software or an algorithm to perform activities as discussed herein. A processor or virtual processor can execute any type of instructions associated with the data to achieve the operations detailed herein. In one example, a processor (such as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

Figure 3:
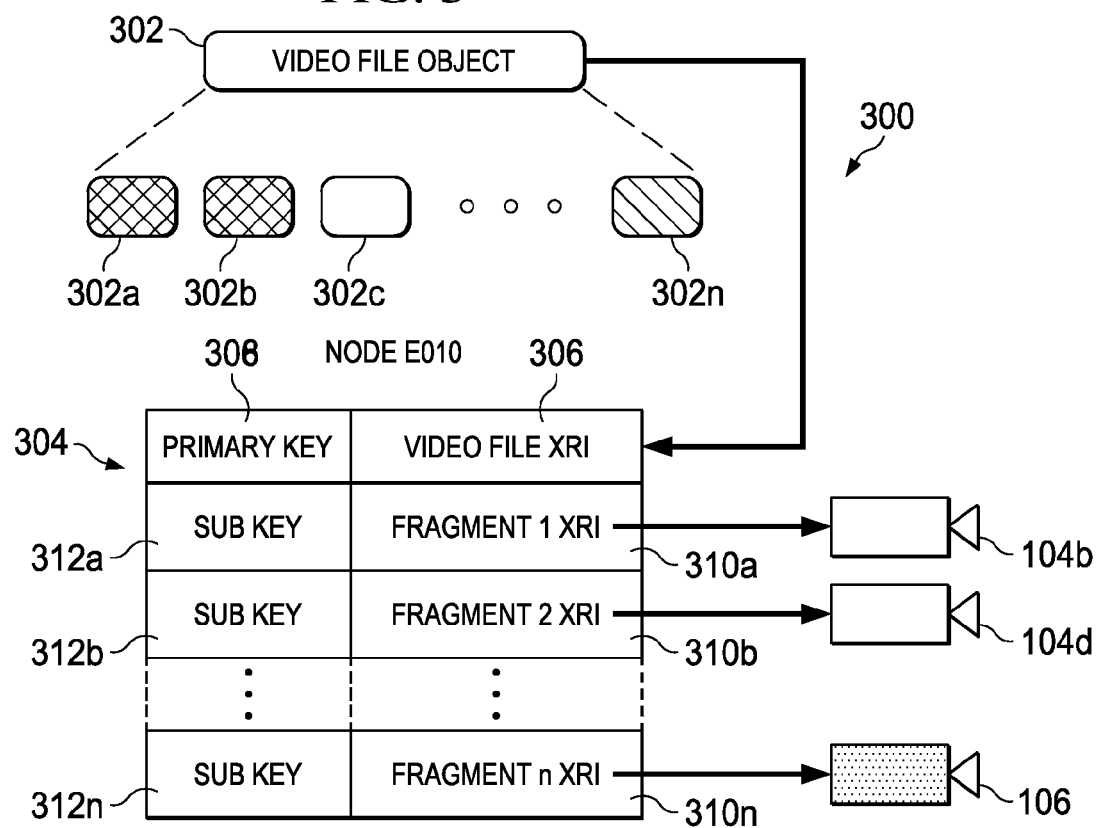
FIG. 3 is a simplified block diagram illustrating details that may be associated with descriptors stored in example embodiments of the surveillance system.

FIG. 3 is a simplified block diagram 300 illustrating details that may be associated with descriptors stored in a DHT in example embodiments of surveillance system 100. Video objects can be fragmented into segments, which may have equal or unequal sizes (e.g., depending on the container format). The segments may be stored in a DHT ring in a distributed fashion. A descriptor may be created for every video object. Each descriptor can be associated with a primary key hashed from a resource identifier, such as a uniform resource identifier (URI) or an extensible resource identifier (XRI). In general, a resource identifier broadly includes any string of characters that uniquely identify a resource (such as a video object) in a network. For example, the location of the camera that captures a video and the time duration of the capture can be encoded in an XRI. Each segment of the video object can also be given an XRI, where the offset of the segment in the original video object can be encoded. These resource identifiers can be used as sub-keys for the descriptor, and can be used to locate segments in the DHT virtual ring. In the advent of root (or any other node failure), the original video object can be retrieved from the distributed topology.

At the PUT stage, the root node can retrieve the object's property and determine the redundancy factor K. The root node can replicate this object 2K times to its neighbors on the DHT ring. This results in 2K+1 object copies in the DHT ring. If nodes leave or join the DHT ring and if this is detected by neighbor maintenance process, the replication process can replicate or move objects based on the same K. additionally, the system administrator can readily modify the object's properties by increasing or reducing K based on object's sensitivity towards data loss or/and a performance requirement. The adjustment could be handled by the root node of the object. In situations where assigning K for all the objects becomes an administrative burden, the system can allow a default K for objects to which certain properties are not set explicitly. Alternatively, the system can derive K for a group objects based on other properties of the objects.

In a retrieval stage, the 2K+1 nodes should be able to respond to requests, which yield (2K+1) times performance in term of throughput. In certain example implementations, the loadbalancing functions can be handled by the root node or in a distributed fashion. This can be done through the generic routing function in DHT implementation. In certain examples, only the root node should be able to answer an object request. However, in other implementations, this limitation can be effectively removed because the recorded video objects (or fragments) are not susceptible to being frequently updated or modified.

More particularly, in FIG. 3, an example video object 302 is fragmented into segments 302a-302n. A descriptor 304 includes a video file XRI 306 for video object 302 and a primary key 308 hashed from XRI 306. Descriptor 304 also includes XRIs 310a-310n for segments 302a-302n, respectively, and sub-keys 312a-312n hashed from XRIs 310a-310n, respectively. Each video object and segment can be treated independently with distinct properties. For example, segment 302a may be stored on camera 104b, segment 302b on camera 104c, and segment 302n on storage node 106. Moreover, video 1 from camera 104a of FIG. 3 can have different DHT policies than video 2 from camera 104a or video 1 from camera 104c. A redundancy factor and an overhead factor can also be implemented in some embodiments of surveillance system 100. The combination of a redundancy factor and an overhead factor can optimize surveillance system 100 for cost and resiliency.

A redundancy factor can define the number of replicated copies of a video object for a DHT. The redundancy factor can be tuned per-source, with each source having varying degrees of granularity (e.g. camera, video, fragment, etc.) based on environment and security policies, for example. The relative importance of cameras can be determined and redundancy factor applied accordingly. In the simplest use case with a redundancy factor of 1, a single copy of a video segment can be used. However, the video may not be able to be reconstructed if two cameras fail or are destroyed. A redundancy factor of 2 can indicate that two copies should be stored in the DHT (in addition to the original on a root node).

An overhead factor can be used to determine the sizing of segments and to allocate storage (per-node) for redundancy storage on non-source nodes. For example, the overhead factor may be defined as a function of the replication factor m, the storage capacity per-node s, and the original object size t, such as $OF=t/s(m+1)$.

Figure 4:
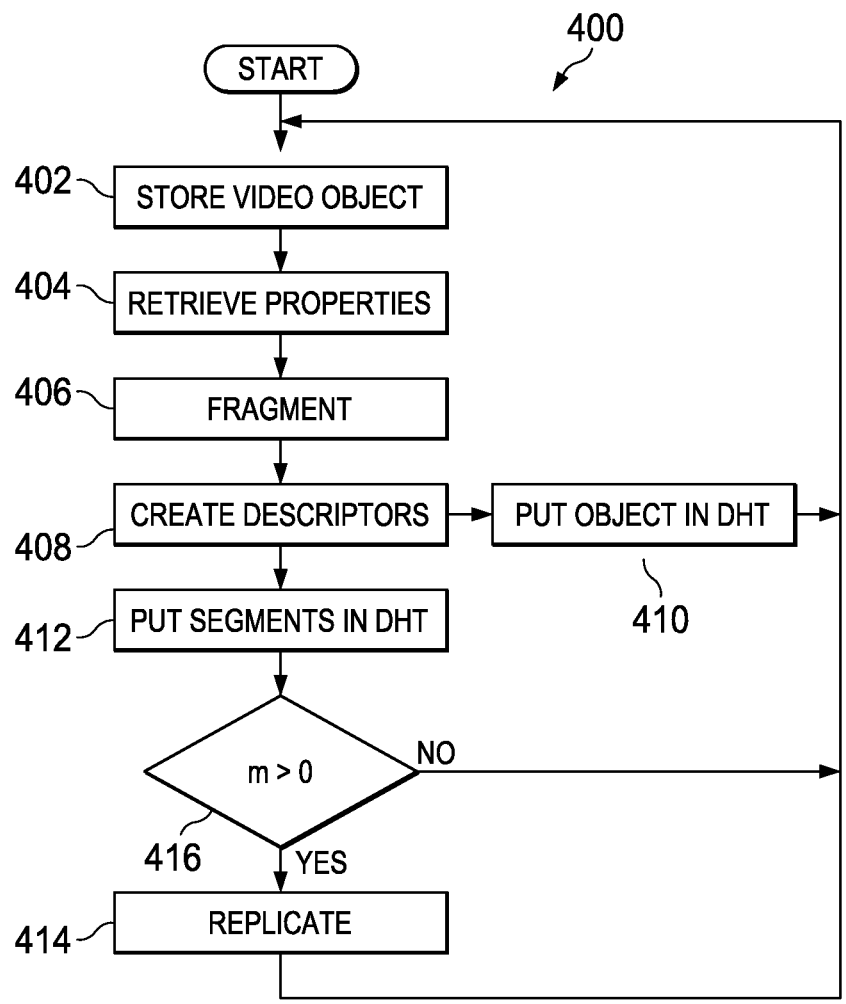
FIG. 4 is a simplified flow diagram illustrating potential operations that may be associated with example embodiments of the surveillance system.

FIG. 4 is a simplified flow diagram 400 illustrating potential operations that may be associated with example embodiments of surveillance system 100. As a preliminary operation, an administrator may establish a keyspace partitioning scheme and per-object policies for redundancy and overhead factors, such as by setting a redundancy factor and an overhead factor for video objects captured on camera 104a during certain times of day. In some embodiments, default policies may be deployed to ease the administrative burden, in which case an administrator may only need to set policies for a limited number of objects for which the default policy may be unsatisfactory. In yet other embodiments, a redundancy factor may be derived from other object properties.

Video for a finite period may be captured and stored as a video object in a source camera at 402. An "object" in this context broadly includes any file, data, or resource for storing data. The properties of the video object, including a resource identifier and a redundancy factor, may be retrieved at 404. The video object can be fragmented into segments at 406, each segment having its own resource identifier. At 408, a DHT descriptor for the video object (and any segments) can be created. More particularly, in one example embodiment, a descriptor in the form of descriptor 304 (illustrated in FIG. 3) can be created by hashing the resource identifiers of the video object and segments to produce a primary key for the video object and sub-keys for the segments.

The video object can be stored in the DHT at 410 with a put(k, data) message to any node in the DHT, where k is the primary key and data is the object. Each segment can also be stored at 412 with a put(k, data) message to any node participating in the DHT, where k is the sub-key for the segment and data is the segment. The messages may be forwarded from node to node through the overlay network until it reaches the single node responsible for key k, as specified by the keyspace partitioning. That node (which can be referred to as the "root" node for the object or segment) can then store the key and the data, and can replicate the data to other nodes in a replica set at 414 if the redundancy factor is greater than 0 at 416. Thus, for a redundancy factor m, m+1 copies are stored in the DHT ring. If a node leaves or joins the DHT ring, a neighbor maintenance process can detect it and replicate or move objects based on the same redundancy factor.

Any client can then retrieve the video object by again hashing the object's resource identifier to generate the key and use a get(key) message to request the object from any DHT node. The message can be routed through the overlay to the node responsible for the key, which can reply with the stored object. In some embodiments, the request for the object can implicitly request segments if the original object is unavailable. Moreover, all m+1 nodes should be able to respond to requests, which increases performance (in terms of throughput) by a factor of m+1. Loadbalancing functions can be handled by the root node or in a distributed fashion, which can be realized through the routing function in a DHT ring.

As described herein, surveillance system 100 can provide many significant advantages, some of which have already been discussed. For example, surveillance system 100 can employ per-object or per-object group policy for redundancy and replication, which may be particularly advantageous because video feeds from different image sensors may have different levels of sensitivity and priority when being stored or retrieved. Surveillance system 100 can improve cost and resiliency by providing per-content, per-camera policies rather than one policy for an entire DHT ring. Polices can also be adjusted dynamically based on changes in system capacity, cost constraints, and/or an object's properties.

Figure 5:
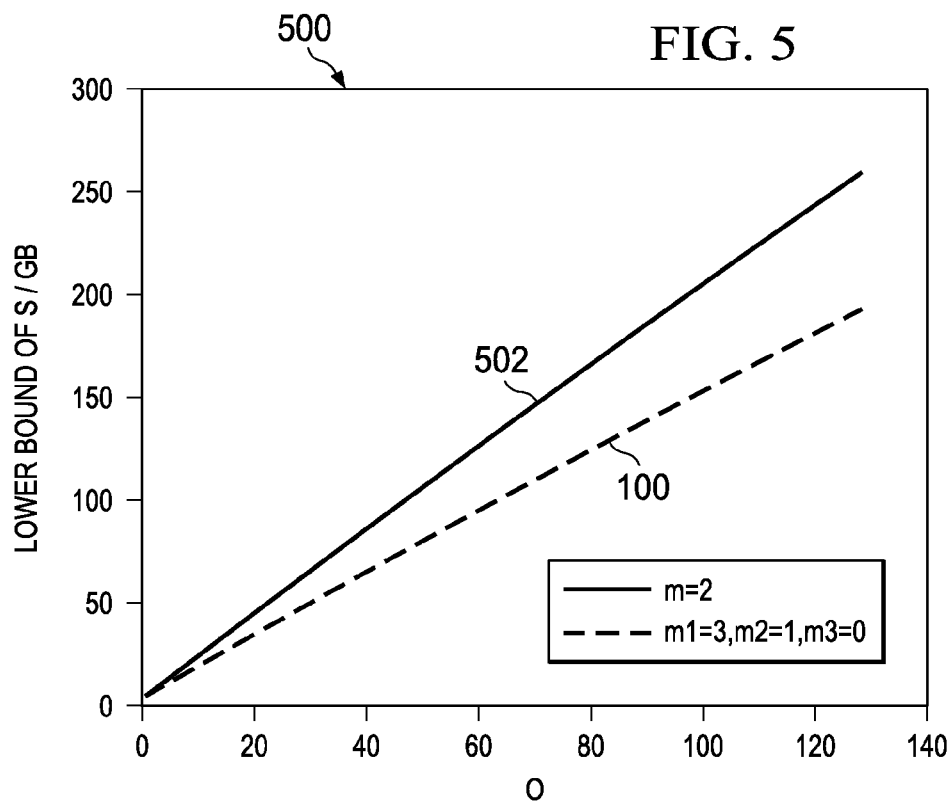
FIG. 5 is a simplified chart comparing per-node storage requirements in an example embodiment of the surveillance system with three different replication factors, and a surveillance system with a single replication factor.

FIG. 5 is a simplified chart 500 comparing per-node storage requirements in an example embodiment of surveillance system 100 using three different redundancy factors, and a surveillance system 502 using a single redundancy factor. More particularly, in this example, surveillance system 100 uses redundancy factors m1=3, m2=1, and m3=0. Surveillance system 502 uses a redundancy factor M=2. The relationship between the storage needed per-node, S, and the number of objects, O, in system 502 can be represented as:

$$S = O(2M+1)/N*u + 3(O*(2M+1)/N)^{(1/2)}*d$$

The relationship in surveillance system 100 can be represented as:

$$S = O(2M+1)/N*u + 3(O*(2m1+2m2+2m3+3)/(3N))^{(1/2)}*d$$

In FIG. 5, the number of nodes N is 16 and the size of each object follows a normal distribution with a mean u=6 GB and a standard deviation d=16 GB. As shown in FIG. 5, the storage requirement is stricter for the same number of objects in system 502. In surveillance system 100, some objects have higher redundancy than others, while the overall storage requirement is reduced.

Figure 6:
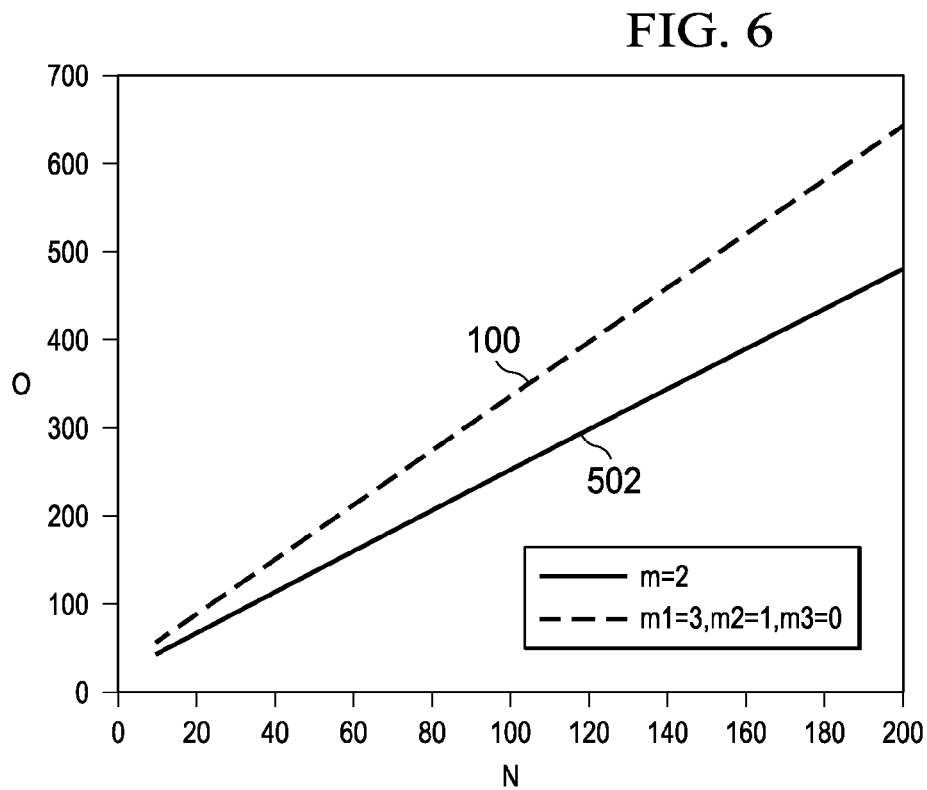
FIG. 6 is a simplified chart comparing an example number of objects that can be supported in the surveillance systems of FIG. 5.

FIG. 6 is a simplified chart 600 simulating the number of objects that can be supported in an example environment. In FIG. 6, the amount of storage per-node is 128 GB in each system. As shown, the number of objects that can be supported for a given number of nodes in this example embodiment of surveillance system 100 is higher than the number of objects that can be supported on the same number of nodes in a system using a single redundancy factor, such as system 502. System redundancy for a system failure event can also be evaluated. Assuming, for example, that n of the N nodes fail or are taken offline. If there are o objects with a redundancy factor m, the expected number of objects among the o objects that have no copy ($o_0$) after n nodes fail can be modeled as:

$$o_0 = o*(n!*((N-2m-1)!)/((N!)*((n-2m-1)!)))$$

To reduce $o_0$ given a particular n, m should be increased. A balanced set of factors can be used in surveillance system 100 to fulfill both storage and redundancy constraints, which provides system flexibility.

In the examples provided above, as well as numerous other potential examples, interaction may be described in terms of two, three, or four network elements. However, the number of network elements has been limited for purposes of clarity and example only. In certain cases, it may be easier to describe one or more of the functionalities of a given set of operations by only referencing a limited number of network elements. It should be appreciated that surveillance system 100 is readily scalable and can accommodate a large number of components, as well as more complicated/sophisticated arrangements and configurations. Accordingly, the examples provided should not limit the scope or inhibit the broad teachings of surveillance system 100 as potentially applied to a myriad of other architectures. Additionally, although described with reference to particular scenarios, where a particular module is provided within a network element, these modules can be provided externally, or consolidated and/or combined in any suitable fashion. In certain instances, such modules may be provided in a single proprietary unit.

It is also important to note that the appended diagrams illustrate only some of the possible scenarios and patterns that may be executed by, or within, surveillance system 100. For example, some operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by surveillance system 100 in that any suitable arrangements, chronologies, configurations, and timing mechanisms may be provided without departing from the teachings provided herein.

Additionally, although the present disclosure has been described in detail with reference to particular embodiments, it should be understood that various other changes, substitutions, and alterations may be made hereto without departing from the spirit and scope of the present disclosure. While the previous discussions have focused on certain content applications, other architectures and protocols could readily adopt the teachings of the present disclosure. For example, the present disclosure can be used in virtually any surveillance applications (e.g., building security, digital advertising (e.g., involving proof-of-lay), casino environments, sports entertainment venues, concerts, etc.). Furthermore, the architecture of the present disclosure could be equally applicable to any media server applications, as well as video conferencing scenarios in which communications occur in real-time (e.g., on-demand), where speech and video data can effectively be captured after failover scenarios.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for redundant storage of video objects, comprising:
    creating a key from a hash of a resource identifier associated with a video object;
    storing the video object, associated with the key, in a root node of a distributed hash table; and
    replicating the video object in the distributed hash table based on a redundancy factor associated with the video object by storing the video object in at least one further node of the distributed hash table,
    wherein the distributed hash table is a decentralized distributed system comprising a plurality of storage nodes, the plurality of storage nodes including the root node and the at least one further node, and wherein the plurality of storage nodes are logically arranged in a ring so that each storage node is communicatively connected to two neighbor storage nodes in that each storage node can forward data to the two neighbor storage nodes.

2. The method of claim 1, further comprising:
    fragmenting the video object into segments;
    creating sub-keys with a hash of resource identifiers associated with each of the segments;
    storing the segments in the distributed hash table with the sub-keys; and
    replicating the segments in the distributed hash table based on the redundancy factor.

3. The method of claim 1, further comprising:
    fragmenting the video object into segments, wherein sizing of the segments is determined based on an overhead factor, and wherein the overhead factor is based, at least, on a storage capacity associated with a particular network element that received the video object, and a size associated with the video object.

4. The method of claim 1, wherein the resource identifier is an extensible resource identifier.

5. The method of claim 1, further comprising:
    storing the key and the resource identifier in a descriptor that is provided in the distributed hash table.

6. The method of claim 1, further comprising:
    fragmenting the video object into segments;
    encoding an offset of each of the segments into a plurality of extensible resource identifiers;
    creating sub-keys with a hash of the plurality of extensible resource identifiers associated with each of the segments;
    storing the segments in the distributed hash table with the sub-keys; and
    replicating the segments in the distributed hash table based on the redundancy factor.

7. The method of claim 6, further comprising:
    storing the key, the sub-keys, and the extensible resource identifiers in a descriptor that is provided in the distributed hash table.

8. The method of claim 1, further comprising:
    fragmenting the video object into segments, wherein sizing of the segments is determined based on an overhead factor;
    creating sub-keys from a hash of resource identifiers associated with each of the segments;
    storing the segments in the distributed hash table with the sub-keys; and
    replicating the segments in the distributed hash table based on the redundancy factor.

9. The method of claim 1, further comprising:
    providing a storage policy for a plurality of video objects propagating in a network, wherein the storage policy defines storage activities for particular content, and wherein the storage policy can be adjusted based on properties associated with the plurality of video objects.

10. The method according to claim 1, further comprising determining the redundancy factor for the video object based on a property of the video object.

11. The method according to claim 1, further comprising identifying the root node as a storage node in the plurality of storage nodes associated with an identifier that is closer to the created key than identifiers of its two neighbor nodes.

12. Logic encoded in one or more non-transitory media that includes code for execution and when executed by one or more processors is operable to perform operations for redundant storage of video objects, the operations comprising:
    creating a key from a hash of a resource identifier associated with a video object;
    storing the video object, associated with the key, in a root node of a distributed hash table; and
    replicating the video object in the distributed hash table based on a redundancy factor associated with the video object by storing the video object in at least one further node of the distributed hash table,
    wherein the distributed hash table is a decentralized distributed system comprising a plurality of storage nodes, the plurality of storage nodes including the root node and the at least one further node, and wherein the plurality of storage nodes are logically arranged in a ring so that each storage node is communicatively connected to two neighbor storage nodes in that each storage node can forward data to the two neighbor storage nodes.

13. The logic of claim 12, the operations further comprising:
fragmenting the video object into segments;
creating sub-keys with a hash of resource identifiers associated with each of the segments;
storing the segments in the distributed hash table with the sub-keys; and
replicating the segments in the distributed hash table based on the redundancy factor.

14. The logic of claim 12, the operations further comprising:
fragmenting the video object into segments, wherein sizing of the segments is determined based on an overhead factor, and wherein the overhead factor is based, at least, on a storage capacity associated with a particular network element that received the video object, and a size associated with the video object.

15. The logic of claim 12, wherein the resource identifier is an extensible resource identifier.

16. The logic of claim 12, the operations further comprising:
storing the key and the resource identifier in a descriptor that is provided in the distributed hash table.

17. The logic of claim 12, the operations further comprising:
fragmenting the video object into segments;
encoding an offset of each of the segments into a plurality of extensible resource identifiers;
creating sub-keys with a hash of the plurality of extensible resource identifiers associated with each of the segments;
storing the segments in the distributed hash table with the sub-keys; and
replicating the segments in the distributed hash table based on the redundancy factor.

18. The logic of claim 17, the operations further comprising:
storing the key, the sub-keys, and the extensible resource identifiers in a descriptor that is provided in the distributed hash table.

19. The logic of claim 12, the operations further comprising:
fragmenting the video object into segments, wherein sizing of the segments is determined based on an overhead factor;
creating sub-keys from a hash of resource identifiers associated with each of the segments;
storing the segments in the distributed hash table with the sub-keys; and
replicating the segments in the distributed hash table based on the redundancy factor.

20. The logic of claim 12, the operations further comprising:
providing a storage policy for a plurality of video objects propagating in a network, wherein the storage policy defines storage activities for particular content, and wherein the storage policy can be adjusted based on properties associated with the plurality of video objects.

21. An apparatus for redundant storage of video objects, comprising:
a processor; and
a memory coupled to the processor, wherein the processor is configured to execute instructions associated with a host function, a forwarding function, and a routing function such that the apparatus is configured for:
creating a key from a hash of a resource identifier associated with a video object;
storing the video object, associated with the key, in a root node of a distributed hash table; and
replicating the video object in the distributed hash table based on a redundancy factor associated with the video object by storing the video object in at least one further node of the distributed hash table,
wherein the distributed hash table is a decentralized distributed system comprising a plurality of storage nodes, the plurality of storage nodes including the root node and the at least one further node, and wherein the plurality of storage nodes are logically arranged in a ring so that each storage node is communicatively connected to two neighbor storage nodes in that each storage node can forward data to the two neighbor storage nodes.

22. The apparatus of claim 21, wherein the apparatus is further configured for:
fragmenting the video object into segments, wherein sizing of the segments is determined based on an overhead factor, and wherein the overhead factor is based, at least, on a storage capacity associated with a particular network element that received the video object, and a size associated with the video object.

* * * * *